June 11, 1940.                R. VOGT                2,204,457
FLOAT SYSTEM
Filed June 13, 1939
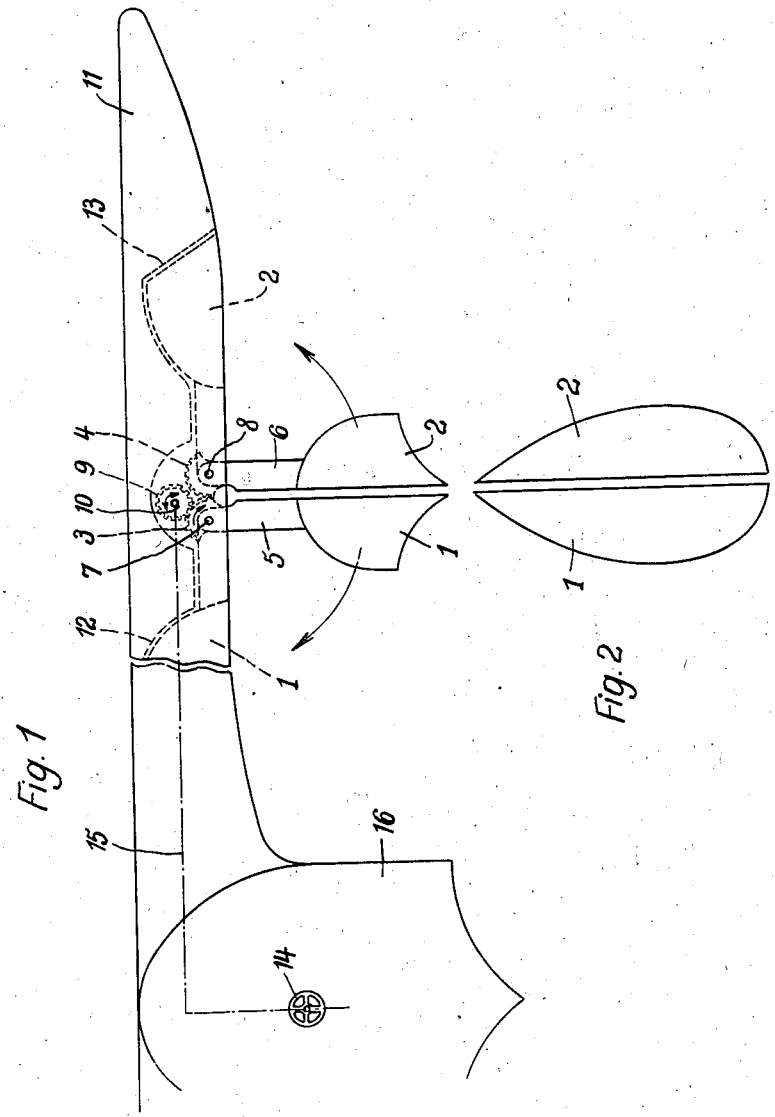
Inventor:
R. Vogt Patented June 11, 1940

2,204,457

UNITED STATES PATENT OFFICE 2,204,457

FLOAT SYSTEM

Richard Vogt, Hamburg, Germany

Application June 13, 1939, Serial No. 278,946
In Germany July 12, 1937

2 Claims. (Cl. 244—102)

This invention relates to a float system for the supporting wings of flying boats.

It is an object of the present invention to provide a float of the kind referred to which can be made to disappear in the wing.

A special object of the invention is to provide means for withdrawing the float in such a manner that it disappears entirely in the wing in spite of its relatively large dimensions with respect to the depth of the wing.

With these and further objects in view, as may become apparent from the within disclosures, the invention consists not only in the structures herein pointed out and illustrated by the drawing, but includes further structures coming within the scope of what hereinafter may be claimed.

The character of the invention, however, may be best understood by reference to certain of its structural forms, as illustrated by the accompanying drawing in which Fig. 1 is a diagrammatical front elevation of one half of a flying boat having the invention applied thereto, while Fig. 2 is a plan view of the float in its operative position.

In the drawing, a pair of supporting floats 1 and 2 are provided which can be swung into the wing 11 as separate elements as indicated in dotted lines but when swung out act practically as a single float unit as shown. The float elements 1 and 2 are secured to arms 5 and 6 which are pivoted in the wing 11, on shafts 7 and 8 and provided with toothed segments 3 and 4 which mesh with each other. A pinion 9 on a shaft 10 in the wing engages the toothed segment 3 for imparting the swinging motion to the floats 1 and 2, through said segments 3 and 4 and said arms 5 and 6. To this end, the pinion 9 can be driven in either direction, under control of an operating member 14 in the pilot's seat (not shown), for example, by means of an electric motor and/or suitable gearing (not shown) and through a transmission 15. The wing 11 is formed with suitable recesses or cavities 12 and 13 for the reception of the floats, as indicated in dotted lines. The boat hull is indicated at 16.

It is also contemplated that a plurality of pairs of floats 1, 2 may be provided if required, for instance, for flying boats of a larger displacement.

It will thus be understood that a flying boat according to the present invention comprises a plurality of floats which can be received in separate recesses of the supporting plane but when swung out into their operative position act practically as a unitary float forming a favourable dynamic shape.

My novel arrangement of supporting floats provides for a sufficient carrying capacity or buoyant power of the float and yet the floats can be withdrawn into the interior of the wing in such a manner that a considerable increase of the speed of the flying boat or hydroplane is attained, due to the reduced aerodynamical resistance.

I am aware that many further changes may be made and numerous details of construction may be varied through a wide range without departing from the principles of this invention, and I, therefore, do not purpose limiting the patent granted hereon otherwise than is necessitated by the prior art.

I claim:

1. A float system for flying boats, comprising at least one pair of swingable float elements and means for swinging said float elements into recesses in the wing of the aircraft and for swinging out said float elements to a position where they are close together and act as a unitary float.

2. A flying boat, comprising a boat hull, two wings, at least one pair of swingable float elements symmetrically arranged on the underside of each wing, means for swinging said float elements into separate recesses of said wings to form a substantially smooth face with the wings in their inoperative condition and means for swinging out each pair of float elements to an operative position in which said elements are close together and act as a unitary float.

RICHARD VOGT.